United States Patent [19]

Vetter et al.

[11] 4,372,739
[45] Feb. 8, 1983

[54] EXTRUSION NOZZLE

[75] Inventors: Heinz Vetter, Rossdorf; Ernst Friederich, Darmstadt, both of Fed. Rep. of Germany

[73] Assignee: Röm GmbH, Darmstadt, Fed. Rep. of Germany

[21] Appl. No.: 263,263

[22] Filed: May 13, 1981

[30] Foreign Application Priority Data

May 21, 1980 [DE] Fed. Rep. of Germany ....... 3019280

[51] Int. Cl.$^3$ .............................................. B29F 3/04
[52] U.S. Cl. ........................... 425/466; 264/176 R; 425/376 A; 425/467
[58] Field of Search .................. 425/466, 461, 376 A, 425/467; 264/176 R

[56] References Cited

U.S. PATENT DOCUMENTS

| | | | |
|---|---|---|---|
| 3,360,823 | 1/1968 | Tyrner | 425/466 |
| 3,384,925 | 5/1968 | Rothemeyer | 425/461 |
| 3,825,645 | 7/1974 | Fayet | 425/461 |
| 3,860,383 | 1/1975 | Sirevicius | 425/461 |
| 4,043,739 | 8/1977 | Appel | 425/461 |
| 4,285,655 | 8/1981 | Matsubara | 425/461 |

FOREIGN PATENT DOCUMENTS

| | | |
|---|---|---|
| 1504354 | 9/1969 | Fed. Rep. of Germany ...... 425/461 |
| 2311685 | 9/1974 | Fed. Rep. of Germany . |
| 2631099 | 1/1978 | Fed. Rep. of Germany . |

OTHER PUBLICATIONS

J. Wortberg, "Extrusion I", IKV publication, Aachen, 1979, pp. 170-177.

Primary Examiner—Jeffery R. Thurlow
Attorney, Agent, or Firm—Curtis, Morris & Safford

[57] ABSTRACT

What is disclosed is an adjustable wide-slit extrusion nozzle containing a distributor channel having a straight exit edge and a cross-section taken from the supply port for the nozzle to one end thereof which corresponds to the equation:

$$R_i = R_o(b/B)^{\frac{1}{4}},$$

wherein:
B is the width of the distributor channel from the supply port to one end of the channel;
b is a width coordinate measured from one end of the distributor channel;
$R_o$ is the hydraulic radius of the distributor channel at the supply port; and
$R_i$ is the hydraulic radius of the distributor channel at the distance b from the channel end.

At least one choker bar insert is placed between the distributor channel and the nozzle mouth; the choker bar has a damming area surface whose length dimensions $L_i$ in the direction of flow at distances b from the channel end correspond to the equation $$L_i = L_o(b/B)^{\frac{3}{4}},$$

wherein
$L_o$ is the length of the damming strip at the supply port;
$L_i$ is the length in flow direction of the damming area at the selected distance b from the channel end; and
b and B are defined as above.

The damming area rises above the remaining surface area of the insert, before or behind the damming area surface, in a uniform jump H, of from 0.1 to 5 times the exit height $H_3$ of the nozzle and is a height-adjustable parallel faced mounted in the nozzle.

5 Claims, 6 Drawing Figures

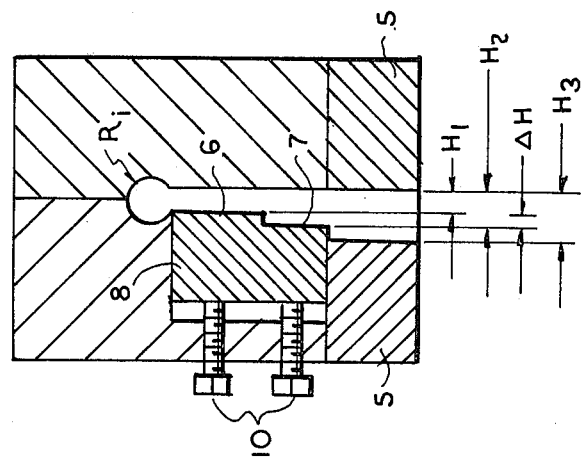
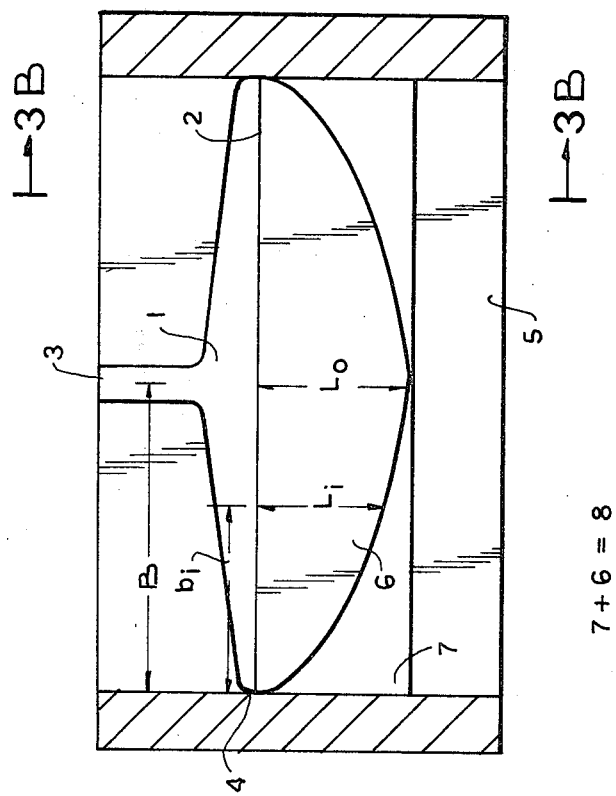
FIG. 3A
FIG. 3B

EXTRUSION NOZZLE

The present invention relates to an improved wide-slit extrusion nozzle and more particularly to an adjustable wide-slit extrusion nozzle capable of extruding material having a uniform thickness distribution under operating conditions which differ with respect to the melt viscosity of the material being extruded, extrusion temperature, and the like.

In the extrusion of wide films or ribbons made of a thermoplastic synthetic resin, the problem arises of extruding a uniform amount of the material from every point of the nozzle mouth at any moment, otherwise a film or a ribbon is obtained having an uneven thickness distribution. Discharge of the molding mass depends on the drop in pressure along the various flow paths in the extrusion nozzle. The thermoplastic mass has a non-Newtonian fluidity, i.e. the viscosity in the distributor channel is a function of the flow velocity. To avoid decomposition phenomena in the molding mass, the melting temperature should be no higher than absolutely necessary and the dwell time should be as short as possible.

Mathematical computations based on these assumptions and requirements have led to a type of extrusion nozzle described by J. Wortberg in the IKV publications, particularly the volume "Extrusion I", Aachen, 1979, pp. 170–177. The characteristic construction is shown in FIGS. 1a and 1b of the drawings. It is distinguished by a "coathanger distributor channel" 1, so called because of its shape, and a damming area 6 placed between the channel and the straight nozzle mouth. Such prior art extrusion nozzles often include an additional choker bar 9. The damming area 6 compensates for the drop in molding mass pressure from the resin supply position or port 3 to the end 4 of the distributor channel by varying the length $L_i$ of the flow path in correspondence with the prevailing pressure, such that about the same molding mass pressure is present along the whole width of the nozzle at the end of the damming area 6 in the direction of the flow path. Differences in pressure still remaining at strip 6 are evened out with the flexible choker bar 9. The latter is installed in the nozzle by means of a row of set screws at different heights or spacings $H_4$.

The geometry of such prior art nozzles is laid out at any particular time only for a particular operating point or condition characterized by the melt viscosity of the synthetic resin, the extrusion temperature, and the supply capacity. Minor deviations from the intended operating point are, for the most part, evened out by the elastic bending of the choker bar. Greater deviations, however, require a reconstruction of the nozzle.

In accordance with the mathematical model used for the calculation of the nozzle parameters, the operating point should be able to be shifted to further limits by providing for an adjustable height of the damming area. However, because of the curved edge of the choker bar, this would lead to practically insoluble sealing problems in fitting the adjustable choker bar.

The problem thus existed of designing a wide-slit extrusion nozzle having an adjustable operating point in which nozzle adjustable inserts would have rectilinear edges and could therefore be snugly fitted in. Furthermore, a solution to this problem should reduce manufacturing costs because a rectilinear distributor channel can be used instead of the "coathanger distributor channel", the manufacture of which involves expensive milling procedures.

The problem has been solved by the nozzle construction of the present invention wherein a damming area is set on a rectangular insert. The solution is based on a recognition of the fact that for every operating point there is an adjustment of the damming area at which the sum of the pressure drops in the distributor channel and over the choker bar are equal for every flow path.

The above, and other objects, features and advantages of this invention will be apparent in the following detailed description of an illustrative embodiment thereof when read in connection with the accompanying drawings, wherein:

FIG. 1b is a sectional view taken along line B—B in FIG. 1a;

Figure 1B:
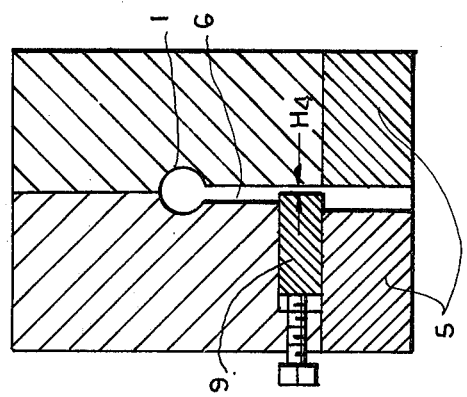
Figure 1A:
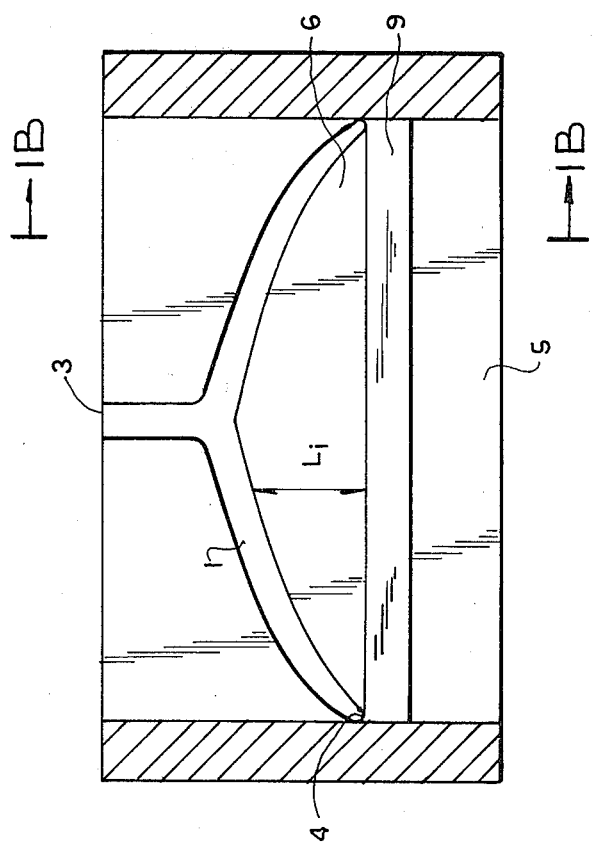
FIG. 1a is a cross-sectional view of a conventional prior art extrusion nozzle with the "coathanger distributor channel."
Figure 2B:
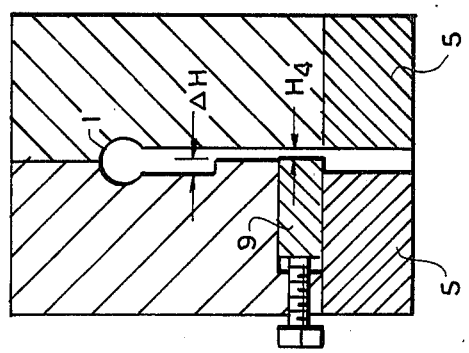
Figure 2A:
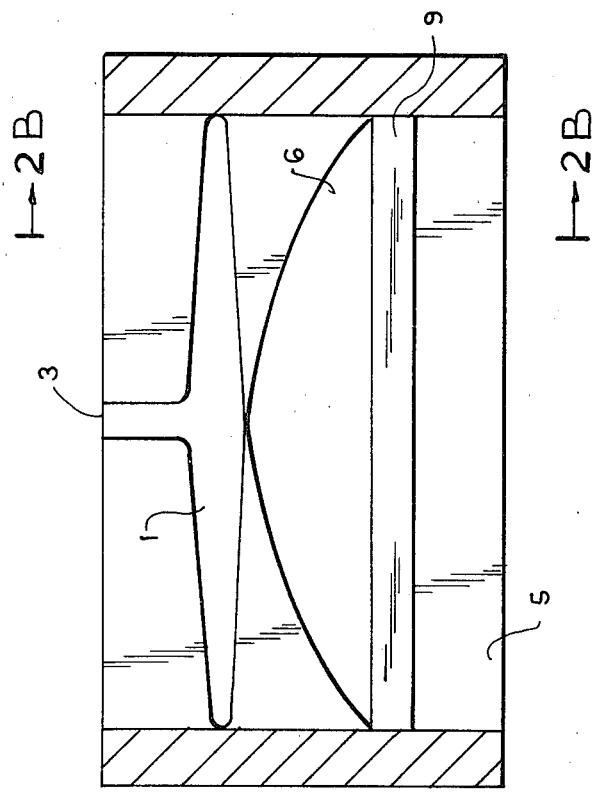

FIGS. 2a and 2b are views similar to FIGS. 1a and 1b of another prior art extrusion nozzle using a straight distributor channel and a stepped choker bar; and FIGS. 3a and 3b are views similar to FIGS. 1a and 1b of the extrusion nozzle of the present invention.

Referring now to the drawings in detail, and initially to FIGS. 1a and 1b, in a prior art extrusion nozzle as shown therein the same amount of molding mass will be extruded per unit time at every point of the extrusion nozzle mouth 5 only if each flow path inside the nozzle has the same drop in pressure. H. Görmar (Dissertation RWTH Aachen, 1968) has shown that this condition is fulfilled if the melt is in the nozzle for a very short time and if the following equalities are true of the geometry of the distributor channel 1 and the damming area 6:

Distributor channel:

$$R_i = R_o(b/B)^{\frac{1}{3}}, \tag{I}$$

Damming strip:

$$L_i = L_o(b/B)^{\frac{2}{3}}, \tag{II}$$

where:

B is the width of the distributor channel from the center of the nozzle supply port 3 to one end 4 of the channel;

b is a width coordinate point measured from the end 4 of the distributor channel;

$R_o$ is the hydraulic radius of the distributor channel at the supply port 3;

$R_1$ is the hydraulic radius of the distributor channel at the coordinate b from end 4;

$L_o$ is the length of the damming strip at the supply port 3; and $L_i$ is the length in flow direction of the damming area at the coordinate b from end 4.

The hydraulic radius $R_o$ or $R_i$ is defined by the quotient $$R_i = 2A_i/U_i \tag{III}$$

wherein $A_i$ is the cross-sectional area and $U_i$ the circumference of the distributor channel at position coordinate b: the corresponding fraction for $R_o$ is valid at the supply port 3.

When the distributor channel is circular, the hydraulic radius is the same as the radius of a circle. However, the distributor channel may have a non-circular cross-section.

Equations (I) and (II) are satisfied by the construction of the distributor channels and damming areas in the known nozzle structures of FIGS. 1a and 2a, as well as for the inventive structure of FIGS. 3a and 3b. However, while the nozzles of FIGS. 1a and 2a are designed only for a definite operating point and cannot produce equal molding mass extrusions at every point of the nozzle mouth under different operating conditions nor under changed operation conditions, the nozzle of the invention can be used at various operating points and still produce equal molding mass extrusions due to the provision of adjustable choker bars 8. This follows from the calculation of the drop in pressure for all flow paths over the whole width of the nozzle. Without going into the mathematical demonstration in detail, only the surprising result will be given here, i.e. for every operating point within the range considered, there is a height adjustment of the choker bar 8 at which the sum of the pressure drop in the distributor channel and the pressure drop over the choker bar insert is constant at each width coordinate point b.

The choker bar according to the invention is a body in the shape of a parallel faced having an arcuate damming area surface 6 formed on and partly covering its rectangular upper surface. The remainder of the surface of insert 8 facing the extrusion channel is recessed or stepped down with respect to area 6 to define surface 7. The difference in height H, between the damming area 6 and the remainder 7 of the surface of the parallel faced damming strip insert is the same at every position thereon; thus, the surface of the damming area 6 is flat and is parallel to the remainder of the surface 7 of the insert. The difference in height, $\Delta H$, defines two channel cross-sections, of heights $H_1$ and $H_2$, in the arrangement the magnitudes of which are related as follows:

$$\Delta H = H_2 - H_1.$$

The absolute values of $H_2$ and $H_1$ can be varied by the traction and pressure screws 10 which secure insert 8 to the nozzle head, thus accomodating the most varied types of operation. The drop in pressure over the rectangular insert comprises the pressure drop in the channel section over the damming area having channel height $H_1$ and the pressure drop in the channel section over the exposed surface of the choker bar having channel height $H_2$.

The difference in height, $\Delta H$, may be 0.1 to 5 times the height, $H_3$, i.e. the height of the nozzle mouth bounded by the nozzle lips. In most cases, the optimum difference in height is somewhere between 0.1 and 0.8 times the value of $H_3$. For very thermally stable molding masses or at lower melting viscosities, a higher value of $\Delta H$, up to the aforementioned limit, can be set. It is advantageous if the damming area begins at the edge on the entrance side of the strip insert, i.e. along the straight edge 2 of the distributor channel 1, and is limited at the exit side by the curve in accordance with equation (II). However, this curve can also be arranged on the entrance side with the straight edge of the choker bar on the exit side. Finally, the damming area can be defined on both sides by a curve, as long as equation (II) remains satisfied.

Since the height-adjustable choker bar already guarantees complete pressure equality within the nozzle, an additional choker bar, such as the bar 9 used in the embodiment of FIG. 1a can, as a rule, be dispensed with in the nozzle of the present invention.

The mouth of the nozzle is formed by two nozzle lips 5 which, in the customary manner, are preferably adjustable and can therefore allow the production of foils or strips of various thickness. The adjustability of the operating point further permits the extrusion temperature or extrusion velocity, i.e. the output capacity, to be varied over considerably broader limits than heretofore possible. In the same way, molding masses having different rheological properties, particularly different melt viscosities at the processing temperature, can be managed on the same extrusion device. The height adjustment of the choker bar can also be changed such that a uniform extrusion pressure is attained over the entire width of the nozzle mouth. Even if not all of the process parameters are freely selectable, an extrusion operation can be obtained with a broad array of production programs involving an obviously small number of different nozzles of the invention type for performing all sorts of extrusion jobs.

The greater versatility of the extrusion nozzles of the present invention is especially suited to the needs of an industrial establishment where basic production possibilities are pretested. In relatively narrow extrusion nozzles, for example one meter or less in width, such as are preferred for testing purposes, a choker bar elastically flexible within broad limits can be accomodated only with difficulty. It is here in particular that the design of the extrusion nozzle of the present invention, without a conventional choker bar 9, has greater significance because it permits greater flexibility of the operation conditions through the adjustable choker bar with a damming area according to the invention than do devices having a flexible choker bar 9 and a firmly fixed damming area.

The manufacture of the extrusion nozzle of the invention, with an adjustable damming area insert, involves no more expense than manufacturing a comparable nozzle with a fixed damming area and a fitted choker bar, despite the greater flexibility of the former. The labor involved in fitting the adjustable choker bar of the invention corresponds to that for a conventional choker bar fitting. Naturally, the nozzle of the invention does not preclude the use of a conventional choker bar. Compared to the usual "coathanger distributor channel" the one-sided rectilinear edge of the distributor channel offers a savings in cost.

Although an illustrative embodiment of the invention has been described herein with reference to the accompanying drawings it is to be understood that the invention is not limited to that precise embodiment, and that various other changes and modifications may be effected therein by one skilled in the art without departing from the scope or spirit of this invention.

What is claimed is:

1. A wide-slit extrusion nozzle having adjustable operating points comprising, a nozzle head having discharge mouth with an exit height $H_3$, a central supply port and a distributor channel formed therein communicated with said supply port, said distributor channel having a straight output edge and a cross-section taken from the supply port to one end of the channel corresponding to the equation $$R_i = R_o(b/B)^{\frac{1}{3}},$$

wherein

B is the width of the distributor channel from the center of the supply port to one end of the channel;

b is a width coordinate point measured from the end of the distributor channel;

$R_o$ is the hydraulic radius of the distributor channel at the supply port; and $R_i$ is the hydraulic radius of the distributor channel at the coordinate b from the end of the channel;

and at least one adjustable choker bar mounted in said head between the distributor channel and the nozzle discharge mouth, said choker bar including a damming area surface having length dimensions $L_i$ in the direction of flow and at distances b according to the equation $$L_i = L_o(b/B)^{\frac{1}{3}},$$

wherein $L_o$ is the length of the damming area at the supply port and b and B are defined as above, said damming area rising in a uniform jump $\Delta H$ of from 0.1 to 5 times the exit height $H_3$ above the area of the remainder of the surface of the choker bar and means for adjusting the height $H_1$ of the distributor channel.

2. A wide-slit extrusion nozzle as defined in claim 1 wherein said damming area and the remainder of the surface of the choker bar insert facing said distributor channel are parallel.

3. A wide-slit extrusion nozzle as defined in claim 2 wherein said means comprises traction and pressure screws operatively connected to said strip.

4. A wide-slit extrusion nozzle as defined in claim 1 wherein said remainder of the surface of the choker bar insert is downstream of the damming area in the direction of extrusion flow.

5. A wide-slit extrusion nozzle as defined in claim 1 wherein said choker bar is a parallel-faced body in the shape of a parallel.

* * * * *